United States Patent
Patel (10) Patent No.: US 6,830,076 B1
(45) Date of Patent: Dec. 14, 2004

(54) SELF-COMPENSATING HYBRID COMBINATION DUCTS

(75) Inventor: Jayant D. Patel, Lake Forest, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/630,902

(22) Filed: Aug. 2, 2000

(51) Int. Cl.[7] ............................................. F16L 57/00
(52) U.S. Cl. ................... 138/110; 138/121; 138/125; 138/126; 138/127; 138/133; 138/138
(58) Field of Search ................... 138/110, 119, 138/121, 125, 126, 127, 133, 138; 156/143, 144

(56) References Cited

U.S. PATENT DOCUMENTS

| | | | | |
|---|---|---|---|---|
| 1,579,474 A | * | 4/1926 | Dempsey et al. | 138/110 |
| 1,786,585 A | * | 12/1930 | Walker | 138/110 |
| 2,185,741 A | * | 1/1940 | Sorg et al. | 138/110 |
| 2,700,988 A | * | 2/1955 | Smisko | 18/110 |
| 3,050,087 A | * | 8/1962 | Caplan | 138/121 |
| 3,060,069 A | * | 10/1962 | Sindars | 138/121 |
| 3,076,737 A | * | 2/1963 | Roberts | 138/121 |
| 3,135,295 A | * | 6/1964 | Ziebold | 138/121 |
| 3,626,988 A | * | 12/1971 | Chu | 138/121 |
| 3,992,505 A | * | 11/1976 | Tally | 264/295 |
| 4,001,918 A | * | 1/1977 | Moore | 138/110 |
| 4,033,381 A | | 7/1977 | Newman et al. | |
| 4,086,665 A | * | 5/1978 | Poirier | 138/121 |
| 4,098,298 A | * | 7/1978 | Vohrer | 138/122 |
| 4,196,031 A | * | 4/1980 | Lalikos et al. | 138/121 |
| 4,295,496 A | * | 10/1981 | Bixby | 138/131 |
| 4,326,091 A | | 4/1982 | Maas et al. | |
| 4,327,776 A | | 5/1982 | Meserole | |
| 4,564,222 A | | 1/1986 | Loker et al. | |
| 4,615,359 A | | 10/1986 | Affa et al. | |
| 4,966,202 A | * | 10/1990 | Bryan et al. | 138/122 |
| 5,031,982 A | | 7/1991 | Redford | |
| 5,062,457 A | * | 11/1991 | Timmons | 138/122 |
| 5,112,088 A | | 5/1992 | Moore et al. | |
| 5,143,409 A | * | 9/1992 | Lalikos | 285/116 |
| 5,158,112 A | | 10/1992 | Wood | |
| 5,388,870 A | | 2/1995 | Bartholomew | |
| 5,466,230 A | * | 11/1995 | Davila | 138/110 |
| 5,469,892 A | * | 11/1995 | Noone et al. | 138/121 |
| 5,560,398 A | * | 10/1996 | Pfleger | 138/121 |
| 5,573,038 A | | 11/1996 | Kanao | |
| 6,000,435 A | * | 12/1999 | Patel et al. | 138/122 |
| 6,050,300 A | | 4/2000 | Schwert et al. | |
| 2002/0179169 A1 | * | 12/2002 | Shanfelt | 138/129 |
| 2003/0075228 A1 | * | 4/2003 | Tippett | 138/125 |
| 2003/0094207 A1 | * | 5/2003 | Qutub et al. | 138/114 |

* cited by examiner

Primary Examiner—James Hook
(74) Attorney, Agent, or Firm—Harness Dickey & Pierce P.L.C.

(57) ABSTRACT

A hose assembly for coupling a plurality of components in fluid connection and a method for making same. According to a first aspect of the invention, the hose assembly includes at least one rigid portion and at least one flexible portion which cooperate to permit the shape and size of the hose assembly to be easily modified so that the components may be coupled to one another. A second aspect of the invention provides a method for reinforcing a flexible portion of the hose assembly to prevent the flexible portion from kinking when the flexible portion is bent. A third aspect of the invention provides a support collar for use in reinforcing an intersection between a pair of duct sections wherein at least one of the duct sections is moveable relative to the other duct section. The support collar reinforces the intersection and helps to render this section less susceptible to tearing. A fourth aspect of the invention provides a hose assembly having a sleeve member which covers at least a portion of a duct member so as to provide the duct member with a predetermined characteristic, such as abrasion, tear or puncture resistance.

1 Claim, 6 Drawing Sheets

SELF-COMPENSATING HYBRID COMBINATION DUCTS

TECHNICAL FIELD

The present invention relates generally to the forming of duct assemblies and more particularly to a duct assembly having an end or intermediate portion which is specifically tailored to the needs of a particular application. The end or intermediate portion may be relatively more flexible and self-forming than the adjoining portion or may have a protective covering to provide the hose assembly with a predetermined characteristic such as abrasion, tear or puncture resistance in a desired area.

BACKGROUND OF THE INVENTION

Background Art

Figure 1:
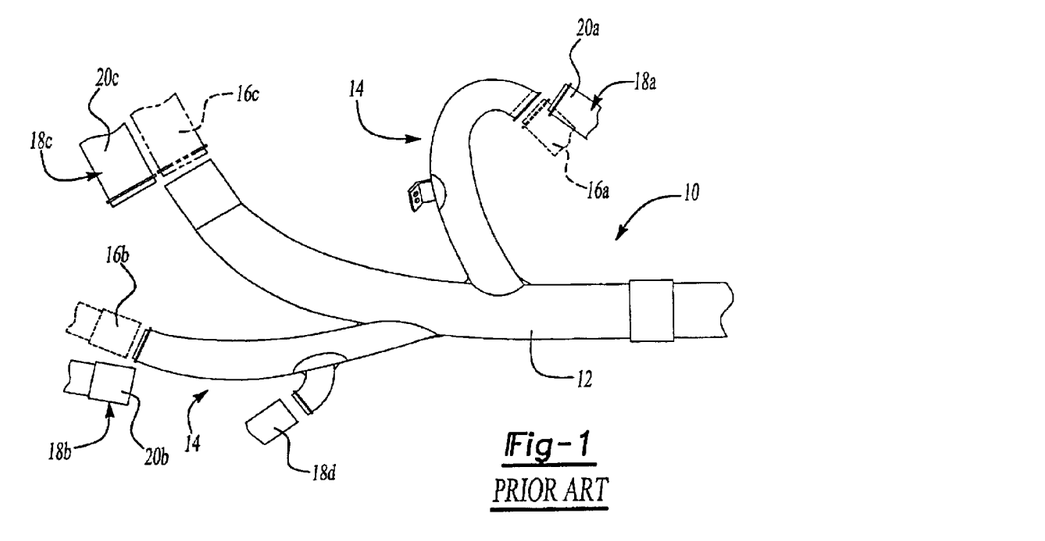
FIG. 1 is a plan view of a conventional prior art duct assembly.

In the aircraft industry, complex ducts are frequently required for the routing of pressurized fluids, including air, throughout the aircraft. These ducts are often times fabricated in from metal or other rigid materials in several long sections, with each section having numerous branches for coupling various components to the duct. An illustrative duct section constructed in this manner is illustrated in FIG. 1.

Duct section 10 includes a body portion 12 and a plurality of branch portions 14. Body portion 12 and branch portions 14 are formed with relatively expensive tools and equipment according to a design model. The design model typically employs the nominal positions or 3-dimensional location 16 of the components 18 that are to be coupled to the duct section 10, as well as the structure of the device into which duct section 10 is attached, to determine the geometry of the body portion 12 and each of the branch portions 14. In a typical situation, the design data for the duct section 10 that is developed from the design model is quite complex, with many curves, bends and branch portions 14 being formed in the duct section 10 throughout its length.

The configuration of the duct section 10 frequently necessitates that it be fabricated in several component parts which are then coupled together via specialized fittings, clamps or welding. Those skilled in the art will readily understand that due to part-to-part variation between the component parts, as well as the variation in which they are assembled, the configuration of duct section 10 can vary widely from the design model. Complicating matters is that the actual positions 20 of the components 18 that are to be coupled to the duct section 10 frequently vary from their nominal position 16.

If the variance between the actual position 20 of the components 18 and the associated connection point of the duct section 10 are severely mis-aligned, it is necessary to take corrective action, such as modifying the tooling on which the component parts of the duct section 10 are fabricated, modifying the design positions of the components 18 which are connected to duct section 10, and/or reworking duct section 10 to tailor it to the particular application. These corrective actions are frequently expensive and time consuming as it is usually quite difficult to identify and quantify each of the variations from the design model. Often times, the corrective action is iterative in nature, with small improvements being made over an extended period of time.

While the amount of time that is expended to achieve a finalized design is one drawback of an iterative design approach, another concerns the proliferation of components that result from the release of "intermediate" versions into production. As each version may have unique servicing and maintenance requirements, thereby increasing the complexity of a servicing program. Furthermore, stocking of several "intermediate" versions may be necessary to ensure that all previously produced products may be timely serviced.

One solution that has been proposed is to break the duct section 10 into a plurality of even shorter sub-sections which are coupled together during the installation of duct section 10 into a particular application. One drawback of the use of multiple duct sub-sections is that depending on the particular application, it can be difficult to couple the sub-sections together if the duct sub-sections are relatively inaccessible for servicing after they are located into the application. This solution is also relatively expensive, can adversely affect the overall reliability of the duct section, increase the frequency with which it must be serviced and add considerable weight to the duct section.

These drawbacks are particularly true where relatively long flexible hoses are employed, as these sub-sections tend to move relative to their associated duct-subsections due to vibrations that are generated in the application and transmitted through the duct. This relative motion renders the intersection between the duct sub-sections more susceptible to failure due to the stresses, strain and/or shear forces that are typically created in that region from the clamping device which secures the hose to its associated duct sub-section and/or abrading on another portion of the application (e.g., the structure to which the duct is coupled).

Accordingly, there remains a need in the art for a duct that is relatively easy and inexpensive to fabricate regardless of the complexity of its configuration. The duct should be easy to install and readily accommodate the variation that occurs from part-to-part and application-to-application. Furthermore, the duct should be easily tailored to the unique needs of an application.

SUMMARY OF THE INVENTION

In one preferred form, the present invention provides a duct assembly for coupling a pair of components in fluid connection. The duct assembly includes a first portion, a second portion and a support collar. The second portion is relatively more flexible than the first portion and in fluid connection with the first portion. The support collar is coupled to an outer perimeter of the second portion and abuts the first portion. The support collar is sized to prevent the formation of a stress riser at an intersection between the first and second portions to thereby render the intersection less susceptible to tearing in response to repeated flexing of the second portion.

In another preferred form, the present invention provides a duct assembly for coupling a pair of components in fluid connection. The duct assembly includes a duct portion and a sleeve portion. The sleeve portion is bonded to an exterior perimeter of the duct portion in a predetermined area of the duct portion and provides the predetermined area of the duct portion with a predetermined characteristic, such as abrasion and tear resistance.

In another preferred form, the present invention provides a method for forming a reinforced flexible duct assembly. The method includes the steps of providing a duct member, determining a diameter of the duct member, selecting a reinforcement member and a reinforcement pitch based on the diameter of the duct member, and bonding the reinforcement member to an exterior surface of the duct member in a helix such that a pitch of the helix is equal to the reinforcement pitch.

In another preferred form, the present invention provides a method for forming a hose assembly for coupling a plurality of components in fluid connection. The method includes the steps of forming a rigid duct structure and a flexible duct structure; and bonding the flexible duct structure to an end of the rigid duct structure to produce a clampless flexible joint which permits an end of the flexible duct structure opposite the rigid duct structure to be moved relative to the rigid duct structure.

In another preferred form, the present invention provides a method for forming a hose assembly for coupling a plurality of components in fluid connection. The method comprising the steps of forming a flexible duct structure from an elastomeric material; forming first and second rigid duct structures, the first and second rigid duct structures being formed to be relatively more rigid than the flexible duct structure; coupling the first rigid duct structure to a first end of the flexible duct structure; and coupling the second rigid duct structure to a second end of the flexible duct structure such that the flexible duct structure permits the first and second rigid duct structures to be moved relative to one another.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENT

Figure 2:
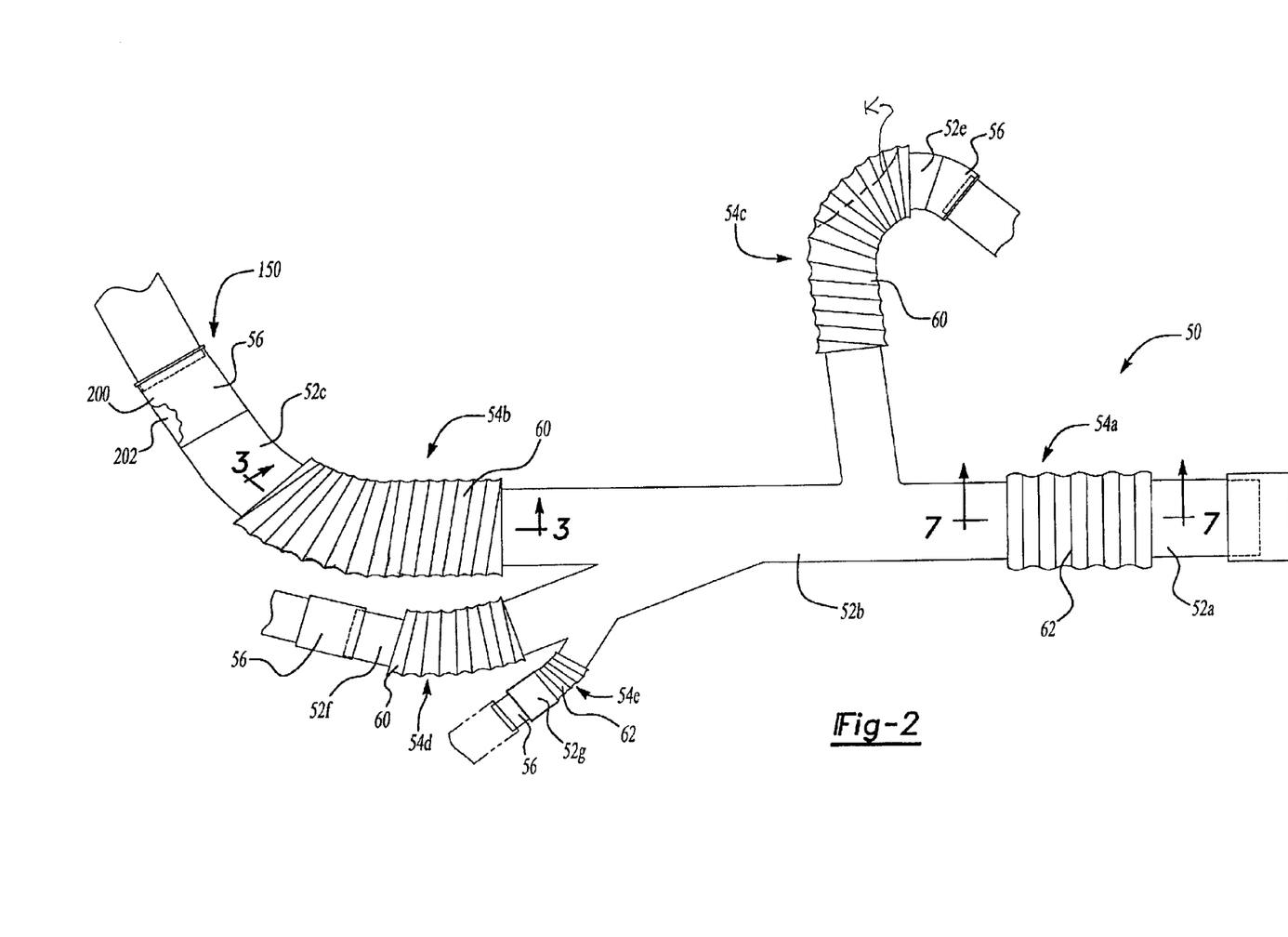
FIG. 2 is a plan view of a duct assembly constructed in accordance with several aspects of the present invention, the duct assembly being shown in an installed condition.
Figure 3:
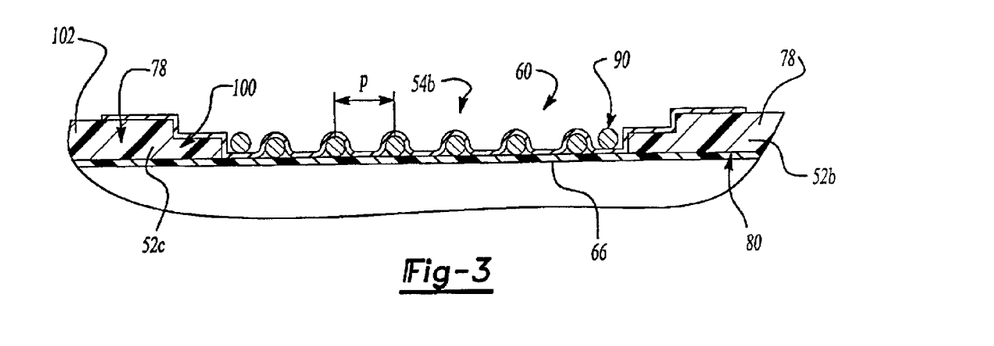
FIG. 3 is a cross-sectional view taken along the line 3—3 of FIG. 2.

With reference to FIG. 2 of the drawings, a duct assembly constructed in accordance with the teachings of the present invention is generally indicated by reference numeral 10. Duct assembly 50 is shown to include a plurality of rigid duct structures 52, a plurality of flexible duct structures 54 and a plurality of elastomeric attachment sleeves 56. Each of the rigid duct structures 52 is formed from a material which is relatively more rigid than the flexible duct structure 54 to which it is adjacent. For example, rigid duct structures 52a and 52b are relatively more rigid than flexible duct structure 54a. In the particular embodiment illustrated, each of the rigid duct structures 52 are fabricated from metals, such as steel and aluminum, plastics and composites such as fiberglass, carbon, KEVLAR® and NEXTEL®.

Each of the flexible duct structures 54 is positioned between an associated pair of rigid duct structures 52 to permit the shape of duct assembly 50 to be easily tailored to the needs of a particular application. The flexible duct structures 54 are illustrated to be bonded to one or more associated rigid duct structures 52 to produce a clampless flexible joint that joins the opposite ends of each of the flexible duct structures 54 to an associated one of the rigid duct structures 52. In the particular embodiment illustrated, flexible duct structures 54b, 54c and 54d are helix reinforced structures 60 and flexible duct structures 54a and 54e are convoluted bellows structures 62.

A detailed description of helix reinforced structure 60 is beyond the scope of the present invention and need not be provided herein. Briefly, and with additional reference to FIGS. 3 through 6, each of the helix reinforced structures 60 is shown to include an inner liner or member 66, a reinforcing helix 68 and an outer member 70. In the example provided, inner member 66 and outer member 70 are formed from conventional elastomeric duct materials (i.e., uncured elastomeric impregnated composite fabrics), such as rubber, silicone, nitrile, butyl, ethylene propylene, neoprene, polyurethane, fluoro silicone and fluoro elastomers and reinforcing helix 68 is fabricated from a thermoplastic material such as polyetherimide, polyphenisulfbne or polyarylsulfone.

Figure 4A:
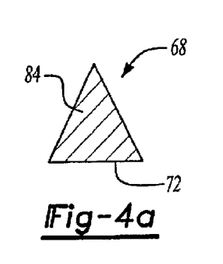
FIGS. 4a, 4b, 4c, 4d, 4e & 4f are cross-sectional views of different helix members.
Figure 4B:
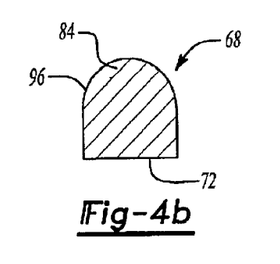
Figure 4C:
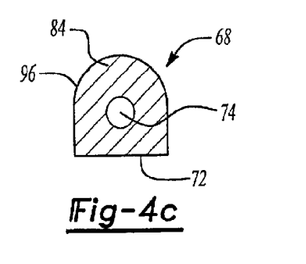
Figure 4D:
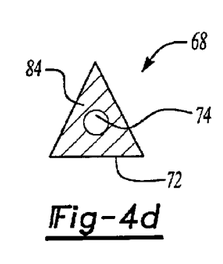
Figure 4E:
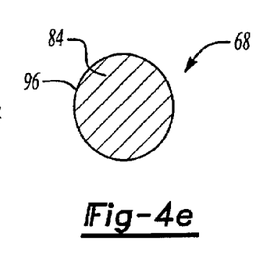
Figure 4F:
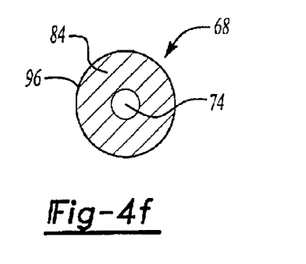

Reinforcing helix 68 is bonded between inner and outer members 66 and 70, thereby reinforcing inner member 66 to guard against bursting, collapsing or kinking. The cross-section of reinforcing helix 68 preferably includes a flat base 72 as shown in FIGS. 4a through 4d but other shapes, such as those shown in FIGS. 4e and 4f may also be used. Reinforcing helix 68 may also have one or more hollow cavities 74 as illustrated in FIGS. 4c, 4d and 4f to reduce the weight and stiffness of duct assembly 50. Helix reinforced structure 60 is otherwise discussed in greater detail in commonly assigned U.S. Pat. No. 6,000,435, the disclosure of which is hereby incorporated by reference as if fully set forth herein.

In fabricating duct assembly 50, the inner member 66 of flexible duct structure 54b is positioned to extend into the ends 78 and bonded to the inner walls 80 of rigid duct structures 52b and 52c. An adhesive material is applied to the exterior surface 82 of inner member 66 and/or to reinforcing helix 68 and reinforcing helix 68 is applied to the portion of the inner member 66 between rigid duct structures 52b and 52c. Preferably, the size of the material forming reinforcing helix 68 (i.e., the reinforcement member 84) as well as the pitch "p" of reinforcing helix 68 are related to the size of the flexible duct structure 54 in accordance with a second aspect of the present invention as shown, for example, in the table set forth below. Sizing reinforcement member 84 and setting the pitch "p" of reinforcing helix 68 to the reinforcement pitch set forth in the table, below, permits flexible duct structure 54 to achieve a good balance of strength and flexibility without the need for experimentation to empirically derive the size of the material and pitch of the helix. Proper selection of the material which forms reinforcing helix 68 and the pitch "p" of reinforcing helix 68 permits flexible duct structure 54 to be bent with a relatively tight bending radius without kinking (illustrated by reference letter "k" in phantom in FIG. 2).

TABLE 1

| Diameter (d) of Flexible Duct Structure (inches) | Dimension of Polyetherimide Reinforcing Helix Material* (inches) | | Reinforcement Pitch | |
|---|---|---|---|---|
| | Solid Cross-Section | Hollow-Cross Section | Solid Cross-Section | Hollow-Cross Section |
| d > 7½ | 0.15 | 0.15 | ¾ | ¾ |
| 7½ ≥ d > 5½ | ⅛ | ⅛ | ¾ | ¾ |
| 5½ ≥ d > 4 | 0.10 | 0.10 | ⅞ | ⅞ |
| 4 ≥ d > 3½ | 0.10 | 0.10 | ¾ | ¾ |
| 3½ ≥ d > 2½ | 3/32 | 3/32 | ¾ | ¾ |
| 2½ ≥ d > 1¾ | 3/32 | 3/32 | ⅝ | ⅝ |
| 1¾ ≥ d > 1¼ | 5/64 | 5/64 | ½ | ½ |
| 1¼ ≥ d > 1 | 1/16 | — | 7/16 | — |
| 1 ≥ d | 1/16 | — | ⅜ | — |

*The term "dimension" is employed to describe the largest cross-sectional width dimension (e.g., diameter) of the reinforcing helix material.

Additional adhesive material may be applied to the inner surface 86 of outer member 70 before outer member 70 is overlaid onto the reinforcing helix 68 and inner member 66 to complete the lay-up of this portion of duct assembly 50. Preferably, however, the lay-up also includes a pair of support collars 90 constructed in accordance with a third aspect of the present invention. Support collars 90 are disposed between reinforcing helix 68 and each of the rigid duct structures 52b and 52c and coupled to the exterior surface 94 of the outer member 70.

Each of the support collars 90 are preferably fabricated from a thermoplastic material such as polyetherimide, polyphenisulfone or polyarylsulfone. The cross-section of the support collars 90 may be solid or hollow and may be identical in configuration to reinforcing helix 68. It is preferred, however, that each of the support collars 90 have a cross-section with a rounded top 96 and a flat base 72, such as the cross-sections shown in FIGS. 4b and 4c. It is also preferred that the ends 78 of the rigid duct structures 52 include an end portion 100 which is smaller in diameter than a body portion 102 of the rigid duct structure 52. End portion 100 preferably has a height which is equal to the height of support collar 90 and a length which is equal to the pitch "p" of reinforcing helix 68.

Figure 5:
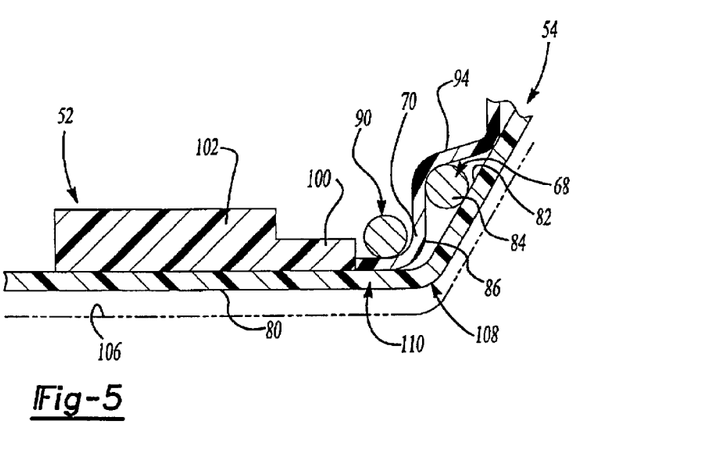
FIG. 5 is an enlarged view of a portion of FIG. 3 illustrating a bent portion of the intersection between the rigid and flexible duct structures when a positive pressure load is applied to the interior of the duct assembly.

In operation, support collar 90 is operable for distributing loads associated with the movement of flexible duct structure 54 relative to rigid duct structure 52, whether the movement be caused from the bending of flexible duct structure 54 or exposure to a fluid pressure differential. In FIG. 5, the interior 106 of duct assembly 50 is exposed to a pressurized fluid, causing flexible duct structure 54 to bulge in an outward direction. Support collar 90 limits the amount by which the wall 108 of flexible duct structure 54 may rotate relative to rigid duct structure 52 and helps to spread the tensile and compressive forces associated with the bulging of the flexible duct structure 54 over a relatively larger area. Support collar 90 is therefore sized to prevent the formation of a stress riser at the intersection 110 between rigid duct structure 52 and flexible duct structure 54 to thereby render the intersection 110 less susceptible to tearing or shearing in response to repeated flexing of the flexible duct structure 54.

Figure 6:
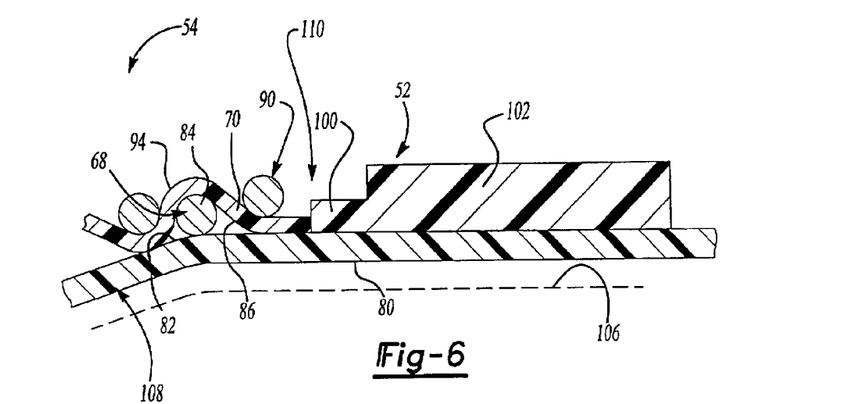
FIG. 6 is a view similar to that of FIG. 6 but illustrating a bent portion of the intersection between the rigid and flexible duct structures when a negative pressure load is applied to the interior of the duct assembly.

A similar condition is illustrated in FIG. 6 wherein the interior 106 of duct assembly 50 is exposed to vacuum pressure, causing flexible duct structure 54 to bulge in an inward direction. Like the situation illustrated in FIG. 5, support collar 90 limits the amount by which the wall 108 of flexible duct structure 54 may rotate relative to rigid duct structure 52 and helps to spread the tensile and compressive forces associated with the bulging of the flexible duct structure 54 over a relatively larger area. A similar condition is also experienced by flexible duct structure 54 when flexible duct structure 54 is bent relative to the longitudinal axis of rigid duct structure 52. Accordingly, support collar 90 is operable for rendering intersection 110 less susceptible to failures from the deformation of flexible duct structure 54 as a result of a differential fluid pressure as well as rendering intersection 110 less susceptible to failures from the movement or flexure of flexible duct structure 54 relative to rigid duct structure 52.

Figure 7:
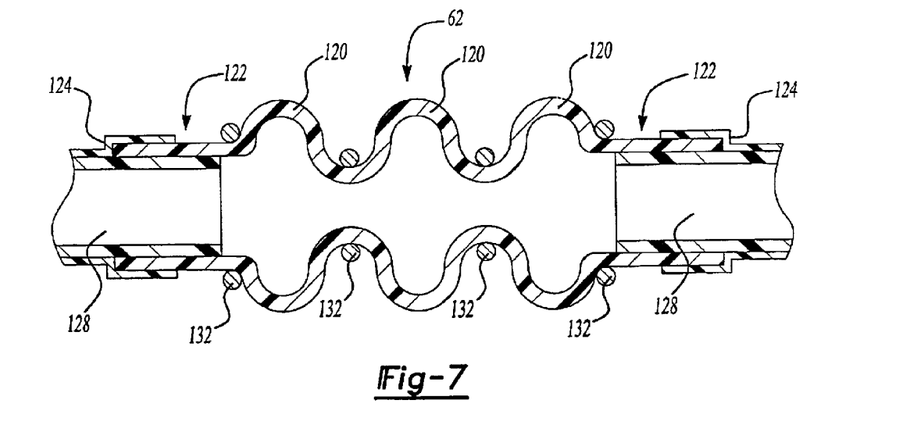
FIG. 7 is a cross-sectional view taken along the line 7—7 of FIG. 2.

Returning to FIG. 2 and with additional reference to FIG. 7, each of the convoluted bellows structures 62 is shown to include a plurality of elastomeric convolutions 120, a pair of end portions 122 and a pair of external plies 124. Convoluted bellows structure 62 is formed from a suitable elastomer, such as silicone, viton, flourosilicone, nitrile or neoprene. The elastomeric material may also be coated or impregnated over a fabric such as fiberglass or kevlar, depending on various design criteria.

Each of the end portions 122 is illustrated to be generally cylindrical in shape and sized to engage the end sections 128 of the rigid duct structures 52a and 52b. External plies 124 may be formed from a material such as fiberglass reinforced silicone and are sized to overlap a portion of one of the end portions 122 and portion of an associated one of the end sections 128, permitting the external plies 124 to secure the convoluted bellows structure 62 to an associated pair of rigid duct structures 52.

The plurality of elastomeric convolutions 120 couple the end portions 122 together and are resilient enough to permit relative axial movement between rigid duct structures 52a and 52b. The convoluted bellows structures 62 are generally employed in relatively short lengths and are generally more flexible than the helix reinforced structures 60. Convoluted bellows structures 62 are typically employed to correct misalignment between the duct assembly 50 and another device (not shown), and/or to permit the length of the duct assembly 50 to be varied and/or to dampen vibrations which are transmitted through duct assembly 50. The number, shape and height of the convolutions 120 and length of the convoluted bellows structure 62 is dependent on various design criteria, such as the anticipated misalignment or desired variation in the length of duct assembly 50.

Depending on the differential fluid pressure, the fluid (e.g., air) in duct assembly 50 may exert a load on convoluted bellows structure 62 which causes the convolutions 120 to expand outwardly, possibly restricting the flow of fluid through duct assembly 50 and/or permitting the convoluted bellows structure 62 to rub and abrade on another component and in severe cases, rupture. Accordingly, a reinforcing material, such as a plurality of thermoplastic or metal reinforcing collars 132, may be incorporated into convoluted bellows structure 62 to locally control the expansion of the convolutions 120.

Returning to FIG. 2, each of the attachment sleeves 56 is illustrated to be bonded to an associated one of the rigid duct structures 52 and is employed where additional stiffness is required, as for example where the ends 150 of duct assembly 50 are clamped to another device. Each of the attachment sleeves 56 is fabricated in a multi-ply manner wherein one or more rigid layers 200 are wrapped around an inner flexible layer 202.

The rigid layers 200 may be formed from a polyester impregnated fiberglass, for example, and the inner flexible layer 202 may be formed from an elastomeric material such as silicone. In the particular example provided, the silicone inner flexible layer 202 is heat resistant and operable for forming a gasket that contains pressurized fluids within duct assembly 50, while the polyester impregnated fiberglass rigid layers 200 is suitable for withstanding the dynamic loading and motions that are transmitted through attachment sleeve 56.

In forming duct assembly 50, it is preferred that a lay-up of the entire duct assembly 50 (i.e., the rigid duct structures 52 be coupled to their respective flexible duct structures 54 and attachment sleeves 56) and duct assembly 50 be co-cured in an oven or autoclave in a single cycle. However, those skilled in the art will also understand that each of the flexible duct structures 54 and attachment sleeves 56 may be pre-cured as necessary and subsequently bonded to one or more of the associated rigid duct structures 52.

Forming duct assembly 50 with flexible duct structures 54 and attachment sleeves 56 is highly advantageous as compared with the duct structures of the prior art because the flexible duct structures 54 permit the rigid duct structures 52 to be fabricated in relatively straight sections, thereby reducing tooling and labor costs associated with the fabrication of duct assembly 50. Furthermore, as flexible duct structures 54 provide a comparatively large degree of latitude in the position of the ends 150 of duct assembly 50, the process of installing duct assembly 50 into an application is considerably easier and faster.

Figure 8:
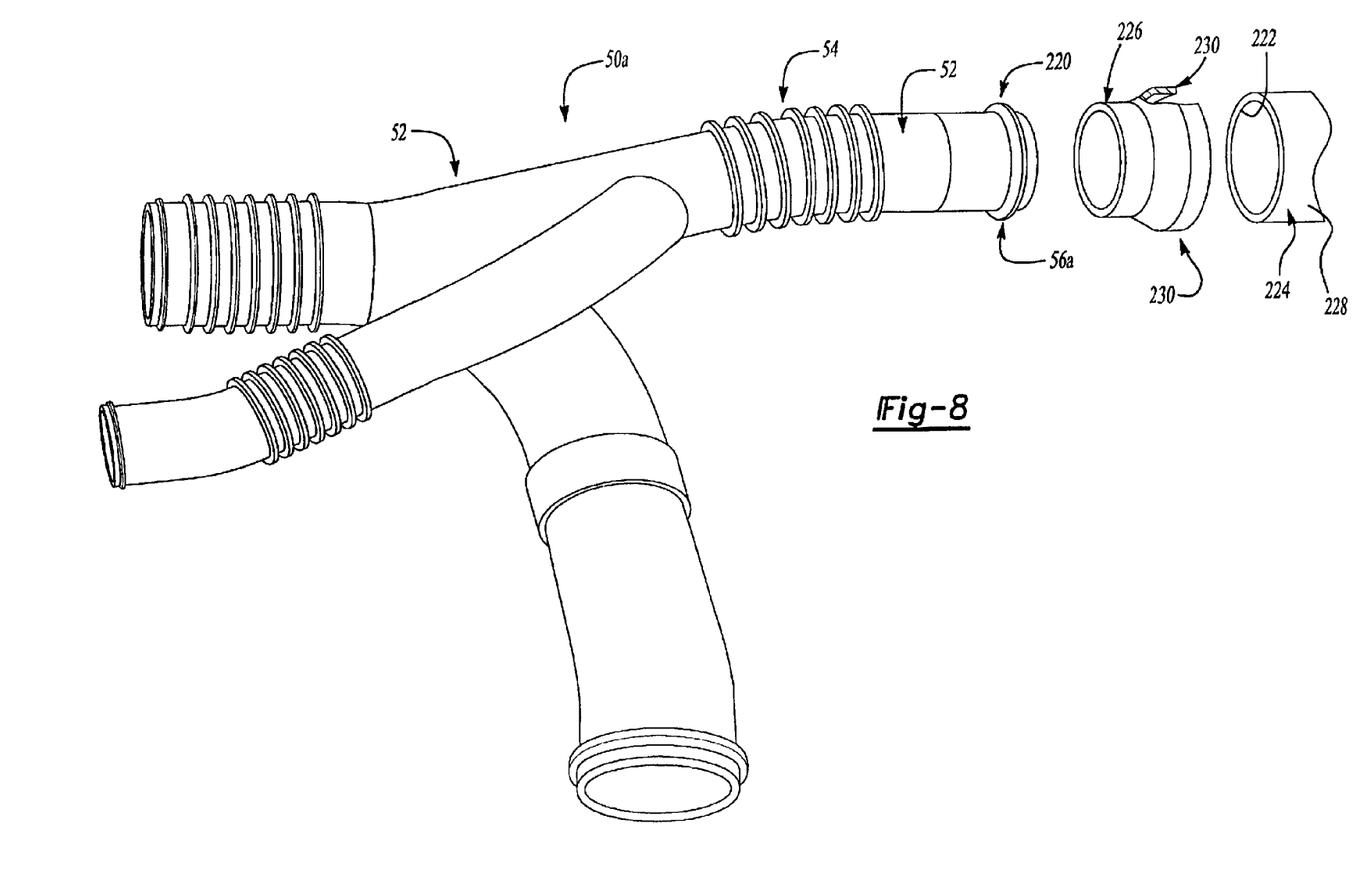
FIG. 8 is a plan view of a duct assembly similar to that of FIG. 2 but illustrating a first alternate construction.

In FIG. 8, duct assembly 50a is illustrated to be similar to duct assembly 50 in that it includes a flexible duct structure 54 and a plurality of rigid duct structures 52. However, duct assembly 50a includes a plurality of attachment sleeves 56a which have a beaded end portion 220 that is operable for engaging the inner diameter 222 of a coupling hose 224. A retaining ring 226 is slid along the outer surface 228 of coupling hose 224 until it passes over beaded end portion 220.

The geometry of retaining ring 226 provides anti-slip resistance to coupling hose 224, preventing coupling hose 224 from detaching from the beaded end portion 220 of hose assembly 50a. Pressurized fluid introduced into duct assembly 50a generates a detaching force causing coupling hose 224 and retaining ring 226 to separate from duct assembly 50a until a curved portion 230 of retaining ring 226 makes contact with beaded end portion 220. Additional detaching force then acts to squeeze retaining ring 226 and coupling hose 224 against beaded end portion 220, thereby creating a seal between coupling hose 224 and duct assembly 50a. Beaded end portion 220 and retaining ring 226 are discussed in greater detail in above-referenced U.S. Pat. No. 6,000,435.

Figure 9:
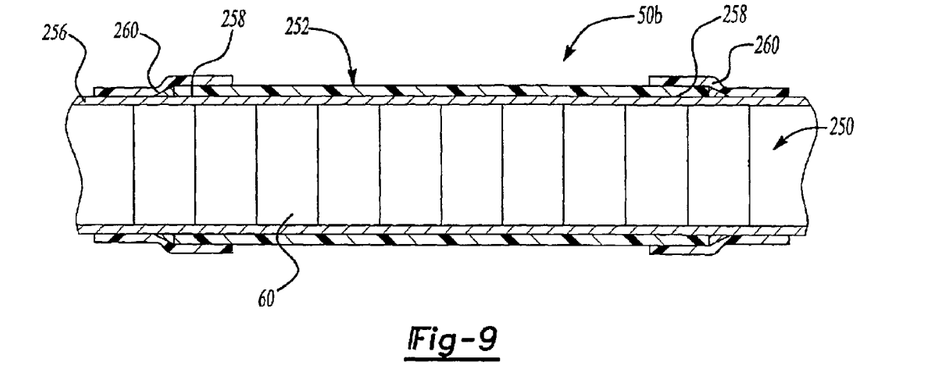
FIG. 9 is a plan view of a duct assembly constructed in accordance with another aspect of the present invention.

In FIG. 9, a portion of a duct assembly constructed in accordance with the teachings of a fourth aspect of the present invention is generally indicated by reference numeral 50b. Duct assembly 50b is shown to include a duct structure 250 and a sleeve member 252. In the particular embodiment illustrated, duct structure 250 is a helix reinforced structure 60 constructed in the manner discussed above and not necessarily coupled to a rigid duct structure 52. However, those skilled in the art will understand that the teachings of this aspect of the present invention may be applied to other types of duct structures including rigid duct structures 52. As such, the scope of this aspect of the present invention will not be limited to duct structures having a helix reinforced structure 60.

Sleeve member 252 includes a hollow central cavity (not specifically shown) which is sized to receive helix reinforced structure 60. Sleeve member 252 is slid over duct structure 250 to a predetermined area of helix reinforced structure 60 and bonded to the exterior perimeter 256 of helix reinforced structure 60. The ends 258 of sleeve member 252 may be secured to a lay-up of helix reinforced structure 60 via several plies of material 260 that are bonded to sleeve member 252 and helix reinforced structure 60. Thereafter, hose assembly 50b is placed in an oven at an elevated temperature to permit the adhesive that bonds helix reinforced structure 60 together as well as adhesive that bonds sleeve member 252 to helix reinforced structure 60 to be simultaneously cured.

Sleeve member 252 is operable for providing the portion of duct structure 250 to which it is coupled a predetermined one or more predetermined characteristics, such as abrasion resistance, puncture resistance or additional strength. If abrasion resistance is required, sleeve member 252 may be formed from a material such as polyester or KEVLAR®. If puncture resistance or additional strength is required, sleeve member 252 may be formed from a woven material, such as steel wire, carbon graphite or KEVLAR® or from a material such as NEXTEL®. If heat resistance or containment is required, sleeve member 252 may be formed from a material such as NEXTEL®.

Figure 10:
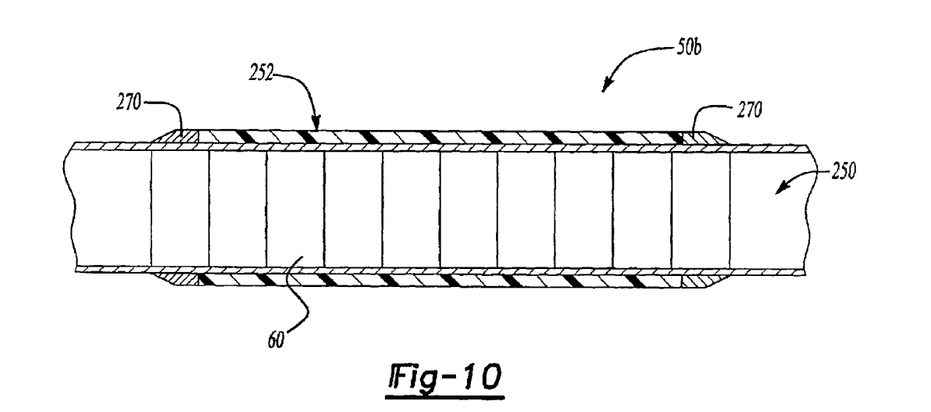
FIG. 10 is a plan view of a duct assembly similar to that of FIG. 9 but illustrating an alternate construction.

In FIG. 10, an alternative method for constructing hose assembly 50b is illustrated wherein helix reinforced structure 60 is be pre-formed and cured prior to the application of sleeve member 252 to helix reinforced structure 60 and the curing of adhesive 270 which couples sleeve member 252 to helix reinforced structure 60. This situation is most likely to arise when duct structure 250 is in need of repair or reworking. In such situations, the repair/rework operation is frequently performed when the duct assembly 50b is partially installed in its operating environment and as such, it is frequently not possible to cure the adhesive in an oven. Accordingly, a silicone adhesive, such as a room-temperature vulcanizing (RTV) silicone adhesive, may be employed to bond sleeve member 252 to duct structure 250.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for forming a reinforced flexible duct assembly comprising the steps of:

provinding a duct member;

determining a diameter of the duct member;

selecting a reinforcement member and a reinforcement pitch based on the diameter of the duct member; and bonding the reinforcement member to an exterior surface of the duct member in a helix such that a pitch of the helix is equal to the reinforcement pitch, wherein the step of selecting the reinforcement member and the reinforcement pitch further includes the steps of:

selecting a reinforcing member having a diameter of about 0.15 inch and setting the reinforcement pitch equal to about three-quarters (¾) of an inch if the diameter of the duct member is greater than seven and one-half (7½) inches;

otherwise, selecting a reinforcing member having a diameter of about one-eighth (⅛) inch and setting the reinforcement pitch equal to about three-quarters (¾) of an inch if the diameter of the duct member is greater than five and one-half (5½) inches;

otherwise, selecting a reinforcing member having a diameter of about 0.10 inch and setting the reinforcing pitch equal to about seven-eighths (⅞) of an inch if the diameter of the duct member is greater than four (4) inches;

otherwise, selecting a reinforcing member having a diameter of about 0.10 inch and setting the reinforcing pitch equal to about three-quarters (¾) of an inch if the diameter of the duct member is greater than about three and one-half (3½) inches;

otherwise, selecting a reinforcing member having a diameter of about three-thirty-seconds (3/32) of an inch and setting the reinforcing pitch equal to about three-quarters (¾) of an inch if the diameter of the duct member is greater than about two and one-half (2½) inches;

otherwise, selecting a reinforcing member having a diameter of about three-thirty-seconds (3/32) of an inch and setting the reinforcing pitch equal to about five-eighths (⅝) of an inch if the diameter of the duct member is greater than about one and three-quarters (1¾) inches;

otherwise, selecting a reinforcing member having a diameter of about five-sixty-fourths (5/64) of an inch and setting the reinforcing pitch equal to about one-half (½) inch if the diameter of the duct member is greater than about one and one-quarter (1¼) inches;

otherwise, selecting a reinforcing member having a diameter of about one-sixteenth (1/16) of an inch and setting the reinforcing pitch equal to about seven-sixteenths (7/16) if the diameter of the duct member is greater than about one (1) inch; and otherwise, selecting a reinforcing member having a diameter of about one-sixteenth (1/16) of an inch and setting the reinforcing pitch equal to about three-eighths (⅜).

* * * * *